United States Patent Office 3,076,265
Patented Feb. 5, 1963

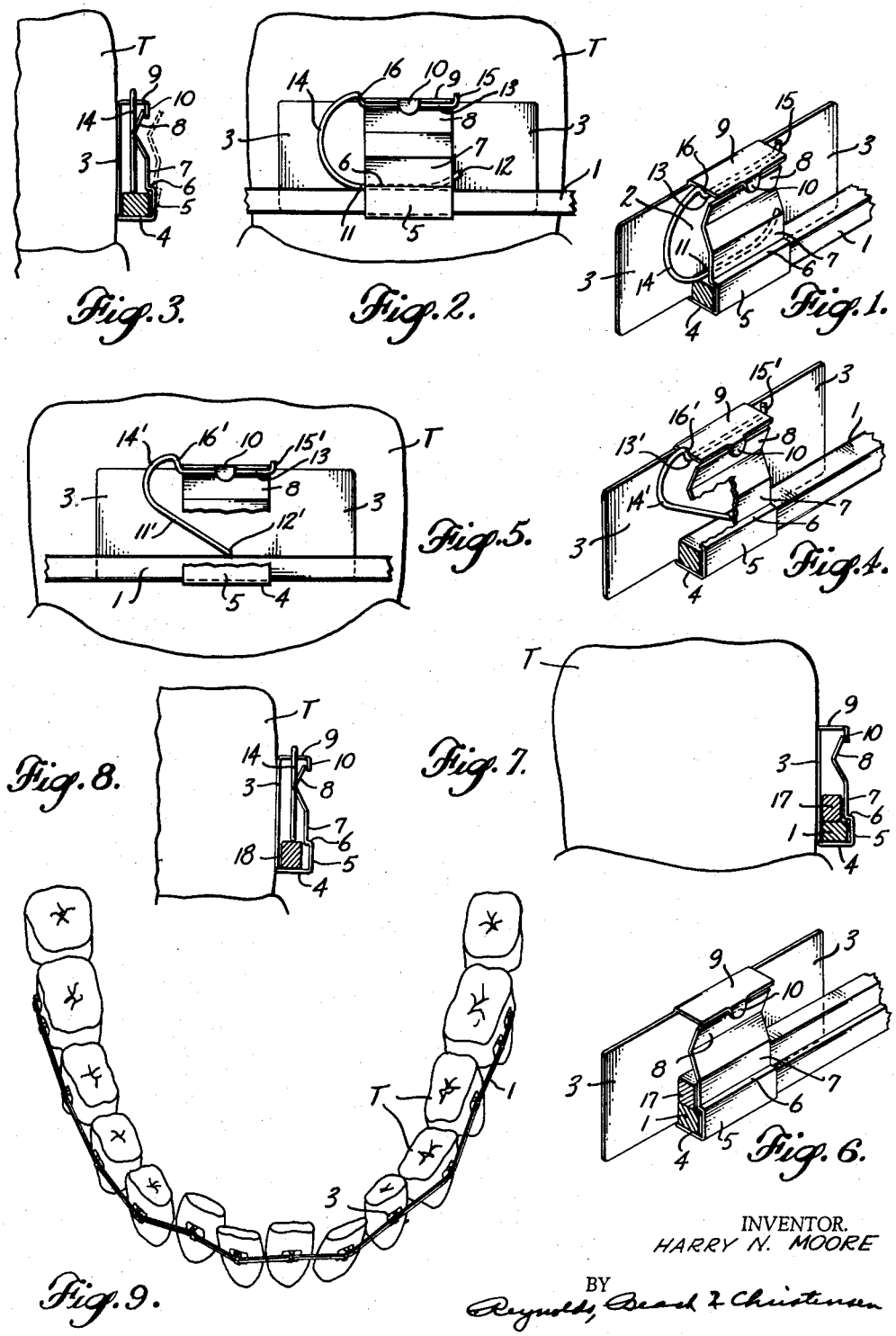

3,076,265
ORTHODONTIC KEEPER BRACKET
Harry N. Moore, Seattle, Wash.
Filed Mar. 17, 1958, Ser. No. 722,025
8 Claims. (Cl. 32—14)

This invention relates to an orthodontic keeper bracket for application to a tooth. An orthodontic arch band is engaged in such brackets secured to at least several and usually most or all of the teeth in each jaw. By such engagement of an arch band in the keeper brackets, the arch band is held to the teeth and through such brackets the arch band can apply to the various teeth persistent forces which will shift the teeth gradually from an improper relationship into a correct relationship.

In the past it has been the practice to secure orthodontic arch bands to all or most of the teeth by individual tooth collars or tie wires which were extended around the bases of the respective teeth and secured to the arch band. The ends of each tie wire were twisted together and the twist bent alongside the arch band. In some instances, teeth were so close together that it was difficult to insert the individual tooth collars or tie wires between adjacent teeth. During mastication, the twisted ends of tie wires sometimes would be displaced so that their sharp ends would prick or cut the sensitive inner surfaces of the lips.

A principal object of the present invention, therefore, is to eliminate the necessity of using individual collars or tie wires around each tooth for connection to an orthodontic arch band. Instead individual tooth brackets are anchored to the teeth and engaged with the arch band.

Another object is to provide keeper brackets for orthodontic arch bands which will hold such bands more accurately and securely and will anchor them more effectively for application of intermaxillary forces.

At the same time, it is an object to secure the arch bands somewhat yieldably to the various teeth so that individual teeth can move slightly relative to the arch band and the other teeth during mastication.

It is also an object to provide better control of the arch band over movement of the teeth by anchoring the keeper brackets in desired locations on the teeth both vertically and horizontally, so as to be able to select the location on each tooth to which force is applied by the arch band.

By employing arch band keeper brackets of the present invention the force exerted by the arch band can be distributed over a large tooth area. Each bracket is secured positively to a tooth so that no relative movement occurs between the tooth-engaging member and the tooth as in the case of tie wires, which movement produces a tendency to wear a groove in the tooth.

Another object is to provide a connection between an arch band and a tooth of a type which will be disconnected or relieved if the force between the arch band and the tooth in a separating direction should be greater than desired.

Use of a bracket attached to the tooth as distinguished from a collar or tie wire encircling the tooth also reduces the tendency of foreign material to lodge between the teeth and cause tooth decay.

Another advantage of the keeper brackets of the present invention is that they enable an arch band to be removed and applied quickly, such as for adjusting its relaxed shape to enable the forces exerted by it on the teeth to be altered readily.

The foregoing objects can be accomplished by an orthodontic keeper bracket having a body of sheet material of channel form, one side of which is bonded to a tooth. The surface area to be bonded can be increased by providing wings extending laterally from such side. The top of this side has a top flange extending outwardly toward the other side of the channel and the edge of such flange has a tab engageable with the other side of the channel for closing the channel. The arch band is lodged in the bottom of the channel and may be held firmly down by a wire hold-down bow bearing against and reacting from the top flange of the bracket.

FIGURE 1 is a top perspective view of the keeper bracket with a section of arch band lodged in it. FIGURE 2 is a front elevation view of such a keeper bracket bonded to a tooth and showing a section of an arch band lodged in it, and FIGURE 3 is an edge elevation view of the keeper bracket taken perpendicular to the view of FIGURE 2.

FIGURE 4 is a top perspective view of the keeper bracket with a section of an arch band lodged in it including a type of spring bow different from that shown in FIGURES 1, 2 and 3, and having parts of the bracket broken away. FIGURE 5 is a front elevation of the keeper bracket including the same type of hold-down spring bow shown in FIGURE 4, parts of such bracket being broken away.

FIGURE 6 is a top perspective view of the keeper bracket having sections of two arch bands lodged in it in superposed relationship, and FIGURE 7 is an edge elevation of such keeper bracket and double arch band arrangement.

FIGURE 8 is an edge elevation of the keeper bracket having a section of an arch band lodged in it flatwise relative to the tooth instead of edgewise relative to the tooth as in FIGURE 3, so that the greater dimension of the arch band cross section extends upright instead of horizontally.

FIGURE 9 is a top perspective view of teeth in a lower jaw to which keeper brackets have been bonded and in which brackets an arch band has been lodged.

In orthodontic correction of the location and relationship of teeth, it has been customary to place arch bands 1 around the teeth of the jaws. Such bands have been applied either to the upper jaw or to the lower jaw or to both jaws of a patient. Usually, it is necessary for such bands to be resilient so that the arch of the jaw will be spread by the force applied to the teeth by the arch band or certain teeth of the jaw will be pulled forward or pushed rearward. It is therefore necessary to connect to the arch band each tooth to which it is desired to apply a force for moving it and usually it is also necessary to connect to the arch band other teeth to which such band is anchored. Such connections between teeth and an arch band usually have been effected by fine wires which are cinched around the individual teeth by passing a wire around the base of each tooth and over the arch band and then twisting the ends together to tension the loop and secure it in place, or by collars encircling the teeth.

Use of such collars or tie wires has had several disadvantages. In the first place, such tie wires were required to be placed around the bases of the teeth to keep them from slipping off the teeth so that, as they were tightened by twisting, they frequently would pinch a portion of the gum. Also, the base portion of the tooth is the most sensitive part and excessive pressure on such portion of the tooth hurts at times. The bearing of the wire on the tooth was necessarily very narrow, which would tend to concentrate pressure on the tooth. Moreover, any movement between the wire and the tooth would tend to wear the tooth. Frequently, teeth are located so close together that it is difficult to place such collars or tie wires between the teeth. When in place such collars or wires obstruct the spaces between the teeth, tending to induce accumulation of food material between them which facilitates decay of the teeth. Such collars and tie wires usually bind the arch band firmly to the teeth so as to restrain the natural slight yielding movement of the teeth relative to the gums during mastication. Moreover, when a piece of food bears on a tie wire, the tie wire is pressed against the gum in a manner to cause pain.

The use of tie wires also has disadvantages for orthodontic purposes. It is very difficult to tighten such tie wires so that the various wires have the same tension and a greater force may consequently be exerted through the tie wires on one tooth than on another inadvertently. If the wires are tightened too tightly, they may break shortly after application, requiring an additional visit to the dentist causing inconvenience both to the dentist and to the patient and meanwhile the ends of the broken wire may prick the gums to cause discomfort. On the other hand, if a tie wire is tightened insufficiently, the arch band will not be held properly and the desired control of the band over the teeth will be lost. When tie wires are used, they must be placed at the bases of the teeth so that the corrective force of the arch band can be applied only at the bases of the teeth. For the most desirable corrective action in some cases, however, it may be preferable for the force to be applied to the tips of the teeth, such as when teeth are tilted inwardly or outwardly as the incisors are shown in FIGURE 9 of the drawings. The various disadvantages and deficiencies of tie wires and collars used to connect arch bands with individual teeth discussed above are overcome by use of the orthodontic keeper brackets of the present invention.

The bracket of the present invention used as a keeper for an arch band 1 is made of resilient sheet material, preferably metal. A suitable metal which would be strong, resilient and non-corrodible is an alloy of gold, platinum and iridium. Titanium could also be used satisfactorily. The keeper bracket is of generally channel shape, including an inner flange 2 which would be bonded to the tooth by a suitable cement such as one of the epoxy resin type. The bracket wall area available to be bonded to the tooth surface can be increased greatly by providing wings 3 extending oppositely from opposite edges of the channel flange 2. The total length of such channel side and wings from wing tip to wing tip would, however, be only about 0.2 of an inch in length and 0.1 of an inch in height, because, as shown in FIGURES 2 and 9, it is necessary that the total length of the part bonded to the tooth be less than the width of the tooth.

The outer side of the channel is connected to the inner side of the channel by the bottom web 4 and includes a lower portion 5 forming the outer side of the socket into which the arch band 1 is received. Above the portion 5 is a ledge or step 6 forming an offset between the riser 5 and the portion 7 of the outer channel side immediately above such ledge or step. Conversely, the exterior ledge or step 6 forms an undercut within the channel at the top of the riser 5, which is spaced from the bottom web 4 a distance just slightly greater than the vertical thickness of the arch band 1 when it is disposed edgewise relative to each tooth T as shown in FIGURES 2 and 3. Thus, the distance between the bottom web and the undercut may, for example, be 0.022 of an inch and the edgewise thickness of the arch band may be 0.018 of an inch, leaving a clearance of 0.004 of an inch vertically.

Preferably the portion 7 of the outer channel side located immediately above the ledge or step 6 is disposed in a plane offset inwardly from but substantially parallel to the riser 5. The height of the portion 7 should be somewhat greater than the height of the riser 5, such as 0.028 of an inch. Above the portion 7 of the outer side is an upwardly and outwardly inclined lip which extends upward approximately to the top of the channel's inner side 2. From the top of the channel's inner side, a top flange 9 projects outwardly a distance substantially equal to the width of the channel's bottom web 4. A latch tab 10 projects downwardly from the outer edge of the flange 9 for overlapping engagement with the upper edge of the outer channel side lip 8. When such lip is engaged in latched position by the latch tab 10, as shown in FIGURES 1, 2 and 3, the lip is held with its upper edge in substantially vertical registry with the lower portion 7 of the bracket. The portion of the outer channel side intervening between the portion 7 and the lip 8 provides an offset by two obtuse angle bends, but if desired, such intervening portion could be formed as an ogee curve.

The height of the keeper bracket is not critical, but the total height of the channel's outer side should be sufficiently great so that, when the latch tab 10 is released from the lip 8, the upper edge of the lip can be moved outwardly from the outer edge of the flange 9 a distance sufficient to enable the arch band 1 to be passed easily between such lip and channel flange edge into the channel without swinging the outer side of the channel through too great an angle. To enable this operation to be accomplished, the total height of the bracket should be at least approximately twice as great as the combined height of the riser 5 and the portion 7 immediately above the ledge 6. A bracket of such height would also enable the outer channel side to be long enough to have sufficient resilience so that the upper edge of the lip 8 could be sprung out from behind the tab 10 to the broken line position of FIGURE 3 without requiring great outward bending of the tab or upward swinging of the top flange 9.

It is also desirable for the keeper bracket to be high enough to enable the legs of a hold-down spring bow to be inserted within it for the purpose of holding the arch band resiliently downward against the bottom web 4 of the bracket channel. Such a spring bow may have one leg 11 inserted within the channel socket bearing on the upper surface of the arch band 1. As shown in FIGURES 1 and 2, this leg is of the runner type, having an upturned end 12 so as not to deter relative movement of the spring bow leg 11 and the arch band 1 lengthwise of the arch band section. The upper leg 13 bears against the under side of the bracket's top flange 9, and the two legs of the bow are joined by the curved portion 14. Preferably, the leg 13 is anchored relative to the top flange 9 such as by a hook 15 formed on the end of this leg which engages the edge of the top flange remote from the curved portion 14 of the hold down bow so as to prevent movement of the bow's curved portion 14 away from the channel portion of the bracket while the hook 15 is engaged with the flange 9. At the opposite side of the top flange the offset 16 in the upper leg of the bow engages the top flange to limit movement of the curved portion 14 of the bow toward the channel portion of the bracket.

In order to permit some movement of the individual teeth relative to the jaw during mastication, some clearance is provided between the arch band 1 and the socket of the bracket. Thus, for example, if the inside width of the channel web 4 is 0.028 of an inch, the greatest cross sectional width of the arch band is 0.025 of an inch, allowing 0.003 of an inch horizontal clearance. Correspondingly, if the spacing between the channel web 4 and the ledge 6 is 0.022 of an inch, the width of the arch band material vertically may be 0.018 of an inch, allowing a clearance of 0.004 of an inch. While the hold-down spring bow normally will tend to keep the arch band down in engagement with the channel web 4, the tooth and brackets can be depressed relative to the arch band through a few thousandths of an inch while the spring bow yields. Such bow will return the bracket and arch band to their previous relationship shown in FIGURES 1 and 2 when the force on the tooth is removed.

A decided advantage to using brackets of the type described above is that the arch band 1 can be located higher or lower relative to the teeth in the jaw simply by securing the brackets in higher or lower positions on the teeth. In some instances where it is desired to provide a better anchor for the arch band, such as at its ends, two of such brackets may be secured to the same molar for receiving the end portions of the arch band. Such an arrangement is shown in FIGURE 9. Because the several brackets are secured positively to the teeth, it is much more practical to interconnect arch bands on the upper and lower jaws for transmitting force from one to the other, such as by elastic bands. In such event, the resilience of the hold-down spring bows may also contribute to the transmission of such intermaxillary forces. Application of such forces to an arch band sometimes tends to cause the band to work endwise and such a tendency can be resisted by employing the different type of hold-down spring bow shown in FIGURES 4 and 5.

The spring bow of FIGURES 4 and 5 includes the curved portion 14' connecting the offset 15' of the upper leg 13' and the lower leg 11'. In this instance, the lower leg is inclined downward and its end 12' is beveled so as to provide a sharp edge or point pressed against the upper surface of the arch band. Such spring bow end serves as a pawl which cooperates with the upper side of the arch band if it is roughened somewhat to resist endwise movement of the band to the left as seen in FIGURE 5. If one or more of such hold-down spring bows are inserted in the brackets adjacent to opposite ends of the arch band with the legs 11' inclined downward toward the back of the jaw, the arch band will be held against lengthwise sliding movement irrespective of the direction in which intermaxillary pull may be exerted on such a band, whether the band is mounted on the upper teeth or on the lower teeth.

A single arch band as shown in FIGURES 1 to 5 inclusive arranged edgewise relative to the teeth is used to pull teeth and roots conjointly bodily. If it should also be necessary to rotate a tooth, it probably would be desirable to employ a double band. Such a double band arrangement is shown in FIGURES 6 and 7, where the upper band 17 is arranged flatwise relative to the teeth T while the lower band 1 is disposed edgewise relative to the teeth as is the band in FIGURES 1 to 5 inclusive. With this arrangement, the lower band will be received in the bottom portion of the bracket's channel socket between the side 2 and the riser 5 and between the bottom web 4 and the ledge 6 of the bracket. The upper arch band 17 will then rest on the upper surface of the arch band 1 and will be received behind the portion 7 of the bracket. The two arch bands may be held in the positions shown in FIGURES 6 and 7 by hold-down spring bows either of the type shown in FIGURES 1, 2 and 3 or of the type shown in FIGURES 4 and 5, depending on the location of the bracket in the mouth and the stresses to be placed on the various portions of the arch bands.

After the teeth have been moved into the desired relationship, the brackets of the present invention may also be employed to secure retainer bands to the teeth. Such a retainer band arrangement is shown in FIGURE 8 as utilizing the single arch band 18 arranged flatwise relative to the teeth. In this instance, the upright thickness of the band, which may be 0.025 of an inch, would be greater than the distance between the channel web 4 and the ledge 6 of 0.022 of an inch. Consequently, the band would be held against excessive horizontal play relative to the bracket because the upper portion of the band would be engaged between the portion 7 of the bracket's outer side and the inner side of the bracket. The arched shape of the band will prevent the band from tilting so that its lower side would move outward into the wider space between the riser 5 of the outer side of the channel and the channel's inner side. As shown, a suitable hold-down spring bow would be used to keep this band in the lower portion of the bracket channel.

It will be evident that by use of brackets such as described above, arch bands can be easily removed and replaced in brackets attached to teeth in a patient's mouth. Thus the arch bands can be replaced by bands having a different degree of resiliency. When the arch bands are removed, individual brackets can be pried off the teeth and applied again in slightly different locations desirable to continue progressive movement of teeth. If, at any time, the outward pull of a band on a particular bracket should be excessive, the pressure of the band will force the outer side of the channel outward far enough to release the lip 8 from the latch tab 10 automatically to relieve the force on the tooth. The resilient sheet material of which the brackets are made preferably is 0.005 of an inch or 0.004 of an inch in thickness. In addition to the various advantages of the present orthodontic bracket over the previous practice of using collars or tie wires, the brackets present a much neater appearance.

I claim as my invention:

1. An orthodontic keeper bracket comprising a channel-shaped body including opposite sides of sheet material, wings extending oppositely from one side of said channel-shaped body and bondable to a tooth and the other side of said channel-shaped body including an offset forming an arch band-receiving socket at the side of such offset remote from the opening of said channel-shaped body.

2. An orthodontic keeper bracket comprising a body securable to the side of a tooth and having an arch band-encircling opening of a size much greater than the cross section of an arch band transversely of its length received in such opening, and a hold-down spring bow having legs received within such body opening, one engageable with an arch band passing through such opening and the other engageable with said body.

3. The orthodontic keeper bracket defined in claim 2, in which the leg of the spring bow engageable with the arch band includes a runner portion engageable with such band having an end bent away from such band.

4. The orthodontic keeper bracket defined in claim 2, in which the leg of the spring bow engageable with the arch band has a sharp end engageable with such band.

5. The orthodontic keeper bracket defined in claim 2, in which the spring bow has a hook engageable with a portion of the bracket body remote from a portion of such bracket body engaged by an arch band.

6. An orthodontic keeper bracket comprising a body securable to a tooth and including opposite sides and a bottom forming a channel-shaped socket for receiving an arch band therein, said body further including a flange extending from one of said body sides toward the other of said body sides and having a latch tab on the edge thereof engageable with such other of said body sides to retain an arch band in such socket.

7. An orthodontic keeper bracket comprising a body securable to a tooth and including opposite sides and a bottom forming an upwardly opening channel-shaped socket engageable with an arch band, one of said sides being bondable to the side of a tooth, and a top flange extending from such body side bondable to the side of a tooth toward the other side of said body and having a downwardly turned latch tab on the edge thereof engageable with the upper edge of such other side of said body.

8. An orthodontic keeper bracket comprising a body of sheet material securable to a tooth and including opposite sides and a bottom forming a channel-shaped socket, one of said sides having an offset forming a wider socket portion and a narrower socket portion in superposed relationship at opposite sides of such offset for receiving stepped arch band means of a width outward from such tooth to which said body is secured greater in said wider socket portion than in said narrower socket portion.

References Cited in the file of this patent

UNITED STATES PATENTS

| | | |
|---|---|---|
| 1,142,790 | Angle | June 15, 1915 |
| 2,019,773 | Wirt | Nov. 5, 1935 |
| 2,665,480 | Johnson | Jan. 12, 1954 |
| 2,686,365 | Schurter | Aug. 17, 1954 |